2,939,842
Patented June 7, 1960

2,939,842
CORROSION INHIBITOR

Ralph B. Thompson, Hinsdale, Ill., assignor, by mesne assignments, to Universal Oil Products Company, Des Plaines, Ill., a corporation of Delaware No Drawing. Filed Dec. 30, 1957, Ser. No. 705,803

4 Claims. (Cl. 252—34.7)

This invention relates to corrosion inhibitors and more particularly to an inhibitor composition for use in preventing corrosion of metal surfaces by water, associated in relatively small quantities, with organic materials.

In the manufacture, handling, transportation and/or use of various organic substances, corrosion problems occur due to the presence of varying amounts of water in solution or in suspension in the organic substances. Illustrative organic substances include hydrocarbon distillates as gasoline, jet fuel, kerosene, lubricating oil, fuel oil, diesel oil, crude oil, etc. Other specific oils include cutting oils, soluble oils, slushing oils, rolling oils, etc. which may be of mineral, animal or vegetable origin. Various coating compositions include grease, waxes, household oils, paints, lacquers, etc. Other organic substances include alcohols, ketones, esters, ethers, dioxanes, amino compounds, amides, etc. In spite of all reasonable and practical precautions which are taken to avoid the presence of water, an appreciable quantity of water separation is found as a film or in minute droplets in the pipe line or on container walls or even in small pools at the bottom of the container. This results in corrosion of the metal surfaces and contamination of the organic substance by the corrosion products.

A recent corrosion inhibitor of especial effectiveness is a polybasic carboxylic acid salt of a hydrocarbon substituted alkylene polyamine and particularly such a salt in which said acid and said polyamine each contain at least 6 carbon atoms per molecule. Particularly effective corrosion inhibitors include acid salts of a dibasic carboxylic acid containing from about 20 to about 50 carbon atoms per molecule and N-alkyl-1,3-diaminopropane in which said alkyl group contains from about 12 to about 20 carbon atoms.

In the preparation of the corrosion inhibitor any suitable polyamine may be employed and preferably comprises alkyl alkylene polyamines which may be illustrated by the following general formula:

RHN—R'—NHR'' where R and R'' are selected from hydrogen and alkyl groups, at least one of which being an alkyl group, and where R' is an alkylene radical. R or R'' preferably comprises an alkyl group of at least 6 carbon atoms and more preferably of at least 10 carbon atoms, and more particularly from about 12 to about 20 carbon atoms.

A particularly preferred alkyl alkylene polyamine comprises one in which R' is a propylene radical, R is an alkyl group derived from tallow and R'' is hydrogen. This compond is named N-tallow-1,2-diaminopropane. This alkyl alkylene polyamine is commercially available under the trade name of "Duomeen T." Other substituted propylene diamines comprise those in which R is an alkyl group derived from lauric acid, coconut, soya, etc. The alkyl propylene diamines set forth above are available commercially at the present time and comprise mixed alkyl substituted propylene diamines. For example, in the case of "Duomeen T," the alkyl substituent contains from about 12 to about 20 carbon atoms per group and mostly containing 16 to 18 carbon atoms. However, when desired, the alkyl alkylene polyamine may be prepared to contain any number of carbon atoms desired in the R and R'' groups. Thus, one or both of these groups may be selected from methyl, ethyl, propyl, butyl, amyl, hexyl, heptyl, octyl, nonyl, decyl, undecyl, dodecyl, tridecyl, tetradecyl, pentadecyl, hexadecyl, octadecyl, nonadecyl, eicosyl, etc., it generally being preferred that one of R or R' is hydrogen and the other is an alkyl group of at least 6 and still more preferably of at least 10 carbon atoms. It is understood that a mixture of different amines may be employed when desired.

Any suitable polybasic carboxylic acid may be utilized in forming the salt of the polyamine and may be dibasic, tribasic, tetrabasic, etc. The specific polybasic carboxylic acid to be employed will be selected with regard to the particular polyamine employed, so that the resultant salt will be readily soluble in the substrate. The polybasic carboxylic acid preferably contains at least 6 and still more preferably at least 10 carbon atoms per molecule and more particularly from about 20 to about 50 carbon atoms per molecule. While the polybasic carboxylic acid may comprise oxalic, malonic, succinic, glutaric, itaconic, mesaconic, citraconic, etc., it preferably contains at least 6 carbon atoms, referred to herein as high molecular weight polybasic carboxylic acid, and thus includes adipic, pimelic, suberic, azelaic, sebacic, phthalic, etc., aconitic, citric, etc., hemimellitic, trimesic, prehnitic,, mellophanic, pyromellitic, mellitic, etc., and higher molecular polybasic carboxylic acids. It is understood that a mixture of acids may be employed.

A particularly preferred acid comprises a mixed by-product acid being marketed commercially under the trade name of "VR–1 Acid." This acid is a mixture of polybasic acids, predominantly dibasic, and has an average molecular weight by basic titration of about 750.

Another particularly preferred acid comprises a mixed acid being marketed commercially under the trade name of "Empol 1022." This dimer acid is a dilinoleic acid and is represented by the following general formula:

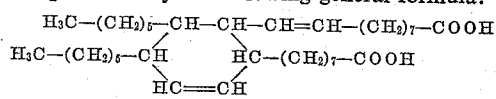

$$\begin{array}{c} H_3C-(CH_2)_5-CH-CH-CH=CH-(CH_2)_7-COOH \\ \diagup \qquad \diagdown \\ H_3C-(CH_2)_5-CH \qquad HC-(CH_2)_7-COOH \\ \diagdown \qquad \diagup \\ HC=CH \end{array}$$

This acid is a viscous liquid, having an apparent molecular weight of approximately 600. It has an acid value of 180–192, an iodine value of 80–95, a saponification value of 185–195, a neutralization equivalent of 290–310, a refractive index at 25° C. of 1.4919, a specific gravity at 15.5° C./15.5° C. of 0.95, a flash point of 530° F., a fire point of 600° F., and a viscosity at 100° C. of 100 centistokes.

In general, the acid salt of the polybasic acid and polyamine is preferred. The acid salt is prepared by utilizing a stoichiometric excess of acid with relation to the amine as, for example, two equivalents of acid per one equivalent of amine. In another embodiment, the salt may be a neutral salt, which is prepared by utilizing stoichiometric amounts of acid and amine. In other words, the concentration of polybasic acid and polyamine will be selected so that there will be an equivalent number of carboxylic acid groups to amino groups. Thus, the specific concentrations will depend upon whether the acid is dibasic, tribasic or higher polybasic acid, and whether the amine is diamine, triamine or higher polyamine. In another embodiment, the salt may be a basic salt, which is prepared by utilizing a deficiency of carboxylic acid groups in relation to the amino groups as, for example, by utilizing one equivalent of carboxylic acid per two equivalents of amine. It is understood that these different salts are not necessarily equivalent.

The salt may be prepared in any suitable manner and, in general, is readily prepared by admixing the polybasic acid and polyamine at ambient temperature, preferably with vigorous stirring. The salt is readily prepared at room temperature, although slightly elevated temperature which generally will not exceed about 200° F. may be employed when desired. Excessive temperature should not be permitted because of the undesired formation of polyamides or other reaction products. Depending upon the particular polyamine and polybasic acid employed, it may be desirable to utilize a solvent, either in forming a more fluid mixture of the acid and/or amine before mixing or during the mixing thereof. In some cases it may be desirable to admix the salt with a solvent in order to form a more fluid final product. Any suitable solvent may be used and conveniently may comprise an organic compound and particularly a hydrocarbon distillate.

As hereinbefore set forth, the polybasic carboxylic acid salts of the alkyl alkylene polyamine are effective corrosion inhibitors. However, in some cases, they do not meet the military specifications for water tolerance. The present invention is directed to a novel corrosion inhibitor composition and use thereof, comprising the polybasic carboxylic acid salt of alkyl alkylene polyamine containing a minor proportion of a specific reaction product which permits the corrosion inhibitor to pass the water tolerance test.

In one embodiment the present invention relates to a corrosion inhibitor composition comprising a polybasic carboxylic acid salt of an alkylene polyamine and the condensation product of polyoxyethylene rosin amine with a terpene-maleic anhydride reaction product.

In another embodiment the present invention relates to a non-corrosive composition of matter comprising an organic material containing dissolved therein the corrosion inhibitor composition as herein set forth.

From the preceding description it will be noted that the novel corrosion inhibitor comprises a polybasic carboxylic acid salt of an alkyl alkylene polyamine together with the condensation product of a polyoxyethylene rosin amine and a terpene-maleic anhydride reaction product.

The polyoxyethylene rosin amine for use in preparing a component of the corrosion inhibitor may be represented by the following general formula.

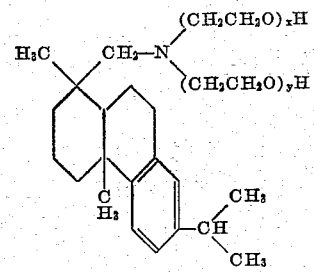

where the sum of $x+y$ is greater than 5 and preferably from about 10 to about 20 although, in some cases, the sum of $x+y$ may be as high as 40.

A particularly preferred polyoxyethylene rosin amine contains a total of 11 polyoxyethylene groups ($x+y=11$) and is being marketed commercially by Hercules Powder Company under the trade name of "Polyrad 1100." Generally the number of polyoxyethylene groups in each substituent group will be approximately equal and, in the case of "Polyrad 1100," will contain 5 polyoxyethylene groups in one substituent and 6 polyoxyethylene groups in the other substituent. However, it is understood that the number of polyoxyethylene groups in each substituent may vary considerably but must total greater than 5 polyoxyethylene groups.

As hereinbefore set forth, the polyoxyethylene rosin amine is condensed with a terpene-maleic anhydride reaction product. Any suitable terpene compound may be employed in preparing the reaction product. In one embodiment a terpene hydrocarbon having the formula $C_{10}H_{16}$ is employed, including alpha-pinene, beta-pinene, dipentene, d-limonene, l-limonene and terpinoline. These terpene hydrocarbons have boiling points ranging from about 150° to about 185° C. In another embodiment the terpene may contain three double bonds in monomeric form, including terpenes as allo-o-cymene, o-cymene, myrcene, etc. Other terpene compounds include alpha-terpinene, p-cymene, etc.

As hereinbefore set forth, the terpene is reacted with maleic anhydride. This reaction generally is effected at a temperature of from about 150° to about 300° C., and preferably of from about 160° to about 200° C. The time of heating will depend upon the particular reactants and may range from 2 hours to 24 hours or more. When desired, a suitable solvent may be utilized. Following the reaction, impurities or unreacted materials may be removed by vacuum distillation or otherwise, to leave a resinous product which may be a viscous liquid or a solid.

A terpene-maleic anhydride reaction product is available commercially under the trade name of "Petrex Acid." This acid is a stringy, yellow-amber colored mass and is mostly dibasic. It has an acid number of approximately 530, a molecular weight of approximately 215 and a softening point of 40°–50° C.

The condensation of the polyoxyethylene rosin amine and terpene-maleic anhydride reaction product is effected in any suitable manner. The condensation generally is effected at a temperature above about 80° C. and preferably at a higher temperature which usually will not exceed about 200° C., although higher or lower temperatures may be employed under certain conditions. The exact temperature will depend upon whether a solvent is used and, when employed, on the particular solvent. For example, with benzene as the solvent, the temperature will be in the order of 80° C., with toluene the temperature will be in the order of 120° C., and with xylene in the order of 150°–155° C. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the condensation product at an elevated temperature, etc. A higher temperature also may be reached by distilling a portion of the solvent. Thus, for example, when using xylene as the solvent, a bottoms temperature of about 170°–175° C. may be reached with a portion of the xylene solvent being distilled overhead with the water. The remaining solvent may be removed by distilling under vacuum or in any other suitable manner. In still another embodiment all or a portion of the aromatic solvent used during the condensation may be allowed to remain in the product when its presence is not objectionable in the subsequent use of the corrosion inhibitor.

The condensation product of polyoxyethylene rosin amine and terpene-maleic anhydride reaction product is incorporated in the polybasic carboxylic acid salt of alkyl alkylene polyamine in a concentration of from about 0.05% to about 10% and preferably of from about 0.05% to about 5% by weight of the salt, although higher concentrations up to about 25% may be used in some cases. For ease in handling the inhibitor composition is prepared as a solution in a suitable solvent. In one embodiment all or a portion of the solvent used in preparing the salt, the terpene-maleic anhydride reaction product and/or the condensation of the polyoxyethylene rosin amine and terpene-maleic anhydride reaction product may be used as the solvent. In another embodiment the various components are mixed and the solvent is added to the mixture or the solvent is added to one or more of the components and then mixed. Any suitable solvent may be employed and preferably comprises a hydrocarbon distillate or hydrocarbon fraction including benzene, toluene, xylene, cumene, naphtha, decalin, etc. The solution may contain from about 10 to about 90% by weight of active constituents, preferably from about 35 to about 70% by weight thereof, and the remainder being the solvent.

The amount of corrosion inhibitor to be employed will depend upon the particular organic substrate in which it is to be used. In general inhibitor composition will be used in a concentration of less than about 5% by weight of the organic substrate and thus may range from about 0.0001% to about 5% by weight and preferably of from about 0.001% to about 1% by weight of the organic substrate. It is understood that the inhibitor composition may be used along with other additives incorporated in the organic substrate for specific purposes and, when desired, the inhibitor composition of the present invention may be admixed with the other additive or additives and marketed as a single commodity of multiple purposes.

As hereinbefore set forth, the inhibitor composition of the present invention may be utilized in any organic substance containing or contacting water and causing corrosion of metals. In one embodiment the inhibitor composition is added directly to the organic substance and intimately mixed to obtain distribution of the inhibitor composition in the organic substrate. When used in plant equipment, the inhibitor composition of the present invention may be introduced into the fractionator or pipe line of the plant equipment, to thereby prevent corrosion of the plant equipment. Generally, a sufficient concentration of the inhibitor composition will be employed so that a portion of the inhibitor composition is retained in the organic substance itself and serves to retard corrosion of metal piping or containers through or into which the organic substance is subsequently passed.

The following examples are introduced to illustrate further the novelty and utility of the present invention but not with the intention of unduly limiting the same.

EXAMPLE I

This example illustrates the effectiveness of a dibasic carboxylic acid salt of N-tallow-1,3-diaminopropane as a corrosion inhibitor. The acid salt was used and was prepared in the following manner. The acid used in this example is "VR-1 Acid" which is available commercially and is a liquid at 77° F., has an acid number of about 150 and an iodine number of about 36. This is a dibasic acid containing about 36 atoms per molecule. The alkyl polyamine used in this example is "Duomeen T" which also is available commercially and has a theoretical molecular weight of 320 and a combining molecular weight (based on 80% active ingredient) of about 400. It is a soft paste and has a melting range of 111°-118° F.

192 parts by weight of "Duomeen T" were warmed moderately (at a temperature of about 120° F.) and 726 parts of "VR-1 Acid" are comingled therewith. The mixing is effected at room temperature and the mixture is vigorously stirred. The resulting salt was prepared as a 40% by weight solution in naphtha. The resultant solution was evaluated in the following manner:

The desired concentration of the salt was added to 50 g. of a fuel oil and then 5 cc. of distilled water were added. One sample did not contain an additive and served as a control or blank sample. A polished, mild carbon steel strip was added to the different samples and the samples shaken vigorously. The samples were stored at room temperature for nine weeks. The results of these tests are indicated in the following table.

Table I

| Additive (wt. percent of oil): | Corrosion |
| --- | --- |
| None | Heavy |
| 0.001% | None |
| 0.0025% | None |

Additional samples are prepared utilizing 0.005%, 0.0075% and 0.01% by weight of the additive. All of the samples show no corrosion after nine weeks of storage.

EXAMPLE II

As hereinbefore set forth, the corrosion inhibitor of Example I is very effective but does not pass the water tolerance test as specified in MIL-I-25017. According to this test 20 ml. of a buffered or distilled water is placed in a 100 ml. glass stoppered graduated cylinder, and 80 ml. of iso-octane containing the corrosion inhibitor is added. The cylinder is shaken for 2 minutes and allowed to stand undisturbed for 5 minutes. The interface then is inspected for any signs of emulsion, scum or foreign matter.

The condensation product for use in the inhibitor composition was prepared in the following manner. 308 g. (equivalent weight of 782) of "Polyrad 1100," 83.5 g. (equivalent weight of 104) of "Petrex Acid" and 200 ml. of xylene were boiled under reflux. Sufficient xylene was removed overhead so that the bottoms temperature was 170°-175° C. A total of 5 ml. of water was collected after about 20 hours of boiling. The xylene remaining in the product was removed by heating under vacuum.

The condensation product prepared as above was incorporated in another sample of the corrosion inhibitor described in Example I in a concentration of 1% by weight thereof. The resulting inhibitor composition was evaluated in the water tolerance test described above.

When the inhibitor described in Example I is evaluated in this test, a heavy emulsion is observed at the interface. However, when 1% by weight of the condensation product described above is incorporated in the corrosion inhibitor, the emulsion at the interface no longer is present, and the inhibitor composition satisfactorily passes the water tolerance test.

EXAMPLE III

A similar water tolerance test for jet fuel is conducted substantially in the same manner except that JP-4 fuel is used. This test is designated as MIL-F-5624.

When a sample of the inhibitor described in Example I is tested in this manner it fails to pass the water tolerance test for JP-4 fuel. On the other hand, a sample of the inhibitor containing 1.5% by weight of the condensation product described in Example II passes the JP-4 water tolerance test.

EXAMPLE IV

As shown in Example II, the novel inhibitor composition of the present invention satisfactorily passes the water tolerance test. However, the corrosion inhibiting properties of this composition were checked to make sure that the added condensation product did not adversely effect the inhibiting properties of the composition. This composition contained 40% by weight of the salt prepared in the manner described in Example I and 1% by weight of the condensation product described in Example II in a naphtha solvent.

When the inhibitor composition was evaluated as a corrosion inhibitor in the same manner as described in Example I, substantially no difference in inhibiting properties were observed with this composition and with the salt described in Example I. Accordingly, the novel composition of the present invention is an effective corrosion inhibitor which passes the water tolerance test.

EXAMPLE V

In order to obtain the improved results of the present invention it is essential that the polyoxyethylene rosin amine used in the condensation contains more than 5 oxyethylene groups. This is illustrated in the present example, in which an inhibitor composition similar to that described in Example II was prepared except that the polyoxyethylene rosin amine contained a total of 5 oxyethylene groups ($x+y$ of the preceding formula=5). When an inhibitor composition similar to that described in Example II but containing 1% by weight of the condensation product of this example is evaluated in the same manner described in Example II, the inhibitor composition did not pass the water tolerance test.

I claim as my invention:

1. A corrosion inhibitor composition consisting essentially of a polybasic carboxylic acid salt of an alkylene polyamine and from about 0.05% to about 10% by weight of the condensation product, formed at a temperature of from about 80° C. to about 200° C., of an equivalent of polyoxyethylene rosin amine containing from 6 to 40 oxyethylene groups with an equivalent of a terpene-maleic anhydride reaction product formed by reacting, at a temperature of from about 150° C. to about 300° C., an equivalent of maleic anhydride with an equivalent of a terpene having the formula $C_{10}H_{16}$ and a boiling point ranging from about 150° to about 185° C.

2. A corrosion inhibitor composition consisting essentially of a polybasic carboxylic acid salt of an alkyl alkylene polyamine, said acid and said polyamine each containing at least 6 carbon atoms per molecule, and from about 0.05% to about 10% by weight of the condensation product, formed at a temperature of from about 80° C. to about 200° C., of an equivalent of polyoxyethylene rosin amine containing from 6 to 40 oxyethylene groups with an equivalent of a terpene-maleic anhydride reaction product formed by reacting, at a temperature of from about 150° C. to about 300° C., an equivalent of maleic anhydride with an equivalent of a terpene having the formula $C_{10}H_{16}$ and a boiling point ranging from about 150° to about 185° C.

3. An organic substance coming in contact with water and the resulting mixture causing corrosion of metal surfaces, said organic substance containing as an inhibitor of said corrosion, from about 0.0001% to about 1% by weight of an inhibitor composition consisting essentially of a polybasic carboxylic acid salt of an alkylene polyamine and from about 0.05% to about 10% by weight of the condensation product, formed at a temperature of from about 80° C. to about 200° C., of an equivalent of polyoxyethylene rosin amine containing from 6 to 40 oxyethylene groups with an equivalent of a terpene-maleic anhydride reaction product formed by reacting, at a temperature of from about 150° C. to about 300° C., an equivalent of maleic anhydride with an equivalent of a terpene having the formula $C_{10}H_{16}$ and a boiling point ranging from about 150° to about 185° C.

4. A hydrocarbon oil coming in contact with water and the resulting mixture causing corrosion of metal surfaces, said oil containing, as an inhibitor of said corrosion, from about 0.0001% to about 1% by weight of an inhibitor composition consisting essentially of a polybasic carboxylic acid salt of an alkylene polyamine and from about 0.05% to about 10% by weight of the condensation product, formed at a temperature of from about 80° C. to about 200° C., of an equivalent of polyoxyethylene rosin amine containing from 6 to 40 oxyethylene groups with an equivalent of a terpene-maleic anhydride reaction product formed by reacting, at a temperature of from about 150° C. to about 300° C., an equivalent of maleic anhydride with an equivalent of a terpene having the formula $C_{10}H_{16}$ and a boiling point ranging from about 150° to about 185° C.

References Cited in the file of this patent

UNITED STATES PATENTS

| 2,605,233 | De Groote | July 29, 1952 |
| 2,626,922 | De Groote | Jan. 27, 1953 |
| 2,638,450 | White et al. | May 12, 1953 |
| 2,742,455 | Sundberg | Apr. 17, 1956 |
| 2,794,782 | Cunningham et al. | June 4, 1957 |
| 2,798,045 | Buck et al. | July 2, 1957 |
| 2,799,659 | Mayhew et al. | July 16, 1957 |
| 2,839,465 | Jones | June 17, 1958 |

FOREIGN PATENTS

| 1,105,891 | France | Dec. 8, 1955 |
| 762,228 | Great Britain | Nov. 28, 1956 |